Nov. 25, 1924.                                               1,517,083
                         W. H. McALLISTER
                              CASTER
                        Filed May 17, 1922            2 Sheets-Sheet 1
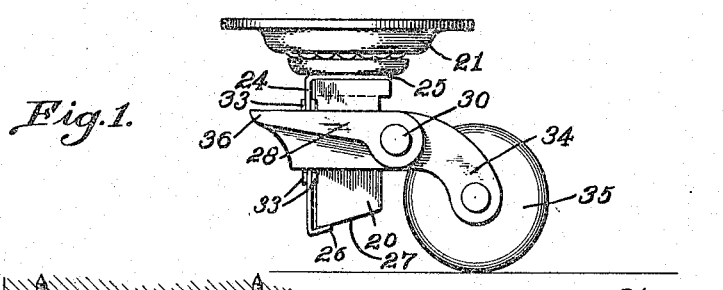
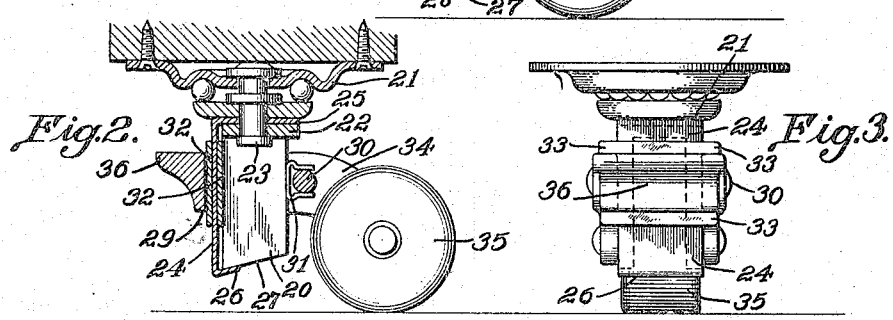
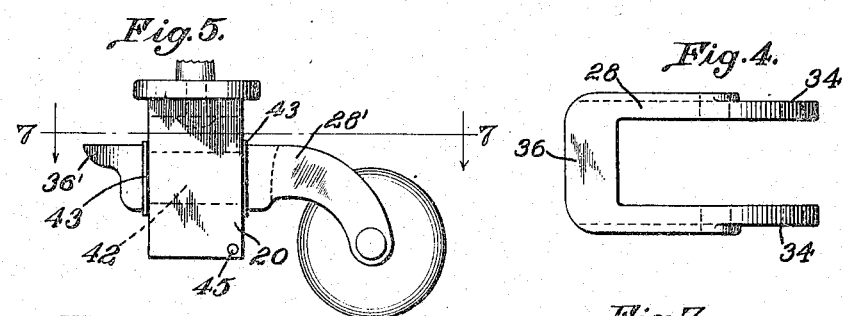
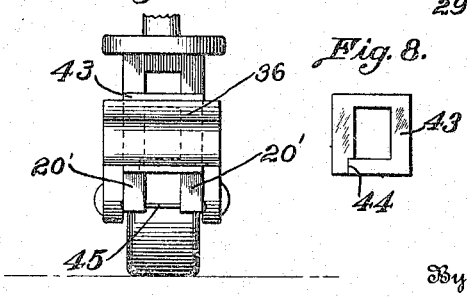
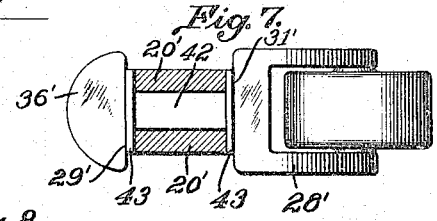
Inventor
Wm. H. McAllister.
By Franklin H. Hough
Attorney

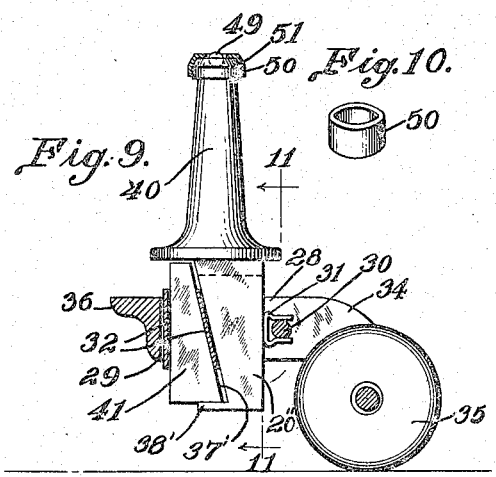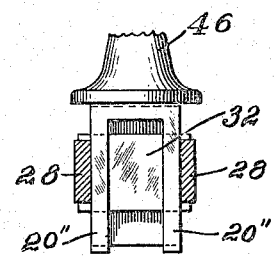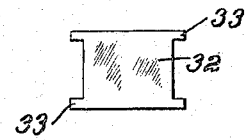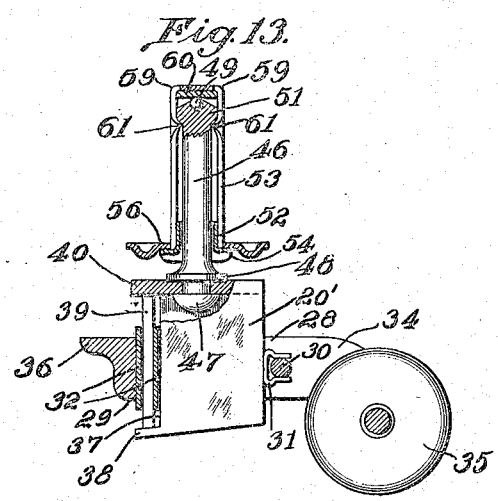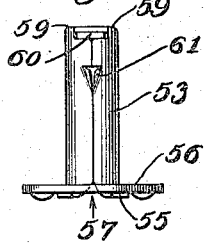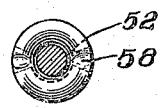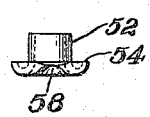

Patented Nov. 25, 1924.

1,517,083

UNITED STATES PATENT OFFICE.

WILLIAM H. McALLISTER, OF LINDEN, PENNSYLVANIA.

CASTER.

Application filed May 17, 1922. Serial No. 561,655.

*To all whom it may concern:*

Be it known that I, WILLIAM H. MCALLISTER, a citizen of the United States, residing at Linden, in the county of Lycoming and State of Pennsylvania, have invented certain new and useful Improvements in Casters, of which the following is a specification, reference being had therein to the accompanying drawings.

This invention relates to casters and has for an object to provide a caster having new and improved means for adjusting the caster to vary the distance between the lower limit of the furniture to which the caster is attached and the floor or supporting surface, whereby the article of furniture may be leveled in case of uneven floor or the like or one side of the article of furniture may be raised higher than the other and subject to adjustment as occasion may make necessary or desirable.

A further object of the invention is to provide a caster having means for adjusting the vertical height with improved means for locking the parts in attained adjusted position.

A further object of the invention is to provide a caster of the type having a spindle inserted into a portion of the article of furniture with improved means for reducing the friction of the turning of the spindle and parts of the caster relative to the furniture.

With these and other objects in view the invention comprises certain novel parts, units, elements, constructions, combinations, functions and mechanical movements, as disclosed in the drawings, together with mechanical equivalents thereof as will be hereinafter more fully described and claimed.

In the drawings:

Figure 1 is a view in side elevation of the caster showing the locking means of one single type;

Figure 2 is a view of the caster in vertical section of the type shown at Figure 1;

Figure 3 is a view of the caster in edge elevation of the type shown at Figure 1;

Figure 4 is a top plan view of the yoke of the type shown at Figures 1 to 3 inclusive;

Figure 5 is a view of the caster in side elevation showing a slight modification of the locking means;

Figure 6 is a view in edge elevation of the type of locking caster shown at Figure 5;

Figure 7 is a view partly in top plan and partly in horizontal section of the type of caster shown at Figures 5 and 6;

Figure 8 is a view in elevation of the locking or wear strip employed in the type of caster shown at Figures 5 to 7 inclusive;

Figure 9 is a view in side elevation of the caster of the type with insertable spindle with a slightly modified locking means, part of the yoke being broken away to show the manner of locking;

Figure 10 is a perspective view of a sleeve, preferably of soft metal, which is applied to and rigidly secured upon the upper or inserted end of the spindle to reduce friction;

Figure 11 is a view taken on line 11—11 of Figure 9 showing the post of the spindle in edge elevation and the yoke in section;

Figure 12 is a view in elevation of the wear member or locking strip used in the type shown at Figures 1, 2, 3, 10 and 11;

Figure 13 is a view partly in elevation and partly in section showing the manner of applying the anti-friction strip to another part of the spindle bearing;

Figure 14 is a view in side elevation of one type of socket member to which the anti-friction member as shown at Figure 13 is applied;

Figure 15 is a view in inverted plan of the anti-friction member showing the spindle in section; and Figure 16 is a view in side elevation of the anti-friction member.

Like characters of reference indicate corresponding parts throughout the several views.

The improved caster which forms the subject matter of this application comprises a rigid post attached to the furniture in some manner to rotate in a horizontal plane or caster. This post assumes slightly different forms in the various types disclosed in the drawings. In the type shown at Figures 1 to 3 inclusive the post 20 is composed of substantially parallel sides in the form of spaced plates, the opposite edges of which are also preferably substantially parallel. This post may be attached to and become a part of a caster employing any type of means for attaching to the furniture. At Figures 1 to 3 inclusive this attaching means is shown as a ball bearing indicated as an entirety at 21, it being understood, however, that the specific type of ball bearing does not enter into the present invention but with the caster as such may be employed in this organization any type of ball bearing found convenient or desirable for the purpose. In the type shown, the caster is attached to the ball bearing by means of a pin or rivet 22 which extends downwardly between the side plates of the post and is provided with an upset head 23. This means of attaching, however, will be varied according to the ball bearing to which the post is applied.

As shown in said Figures 1 to 3 inclusive a plate 24 is attached to and spaced away from the post 20 providing a narrow or attenuated space between said plate and post. As shown, the attaching is accomplished by means of an offset portion 25 inserted between the post 20 and the lower member of the ball bearing and secured and held rigidly in position by means of the rivet 22. Also preferably the lower end 26 of this plate is bent over and hooked under the vertically inclined side 27.

About the post member, now composed of the post 20 and the plate 24, a yoke is employed indicated in top plan at 28 in Figure 4 and in side elevation at Figure 1. This yoke comprises a shoulder 29 (see Fig. 2) and a pin 30 with a wear member or keeper 31 thereon. Interposed between the plate 24 and the post 20 is a locking plate or wear member 32 and a similar plate similarly numbered between the plate 24 and the shoulder 29. This plate is shown at Figure 12 and is provided with ears 33 which are positioned upon the top and bottom edges of the yoke 28, as shown more particularly at Figures 1 and 3. The yoke 24 has downwardly turned arms 34 carrying a caster wheel 35 of any preferred type. It is also provided with a toe-piece 36 under which the toe of the operator may engage for dis-engaging the lock in the manner hereinafter more fully described.

As shown at Figure 13 the post 20' is provided with a cut-out at 37 forming a finger 38 to support a plate 39 the equivalent of the plate 24 but not attached rigidly to the post, as in Figures 1 to 3 inclusive, but floating between the finger 38 and the toe-plate 40 of the post. Similar or identical wear members 32 are interposed between the plate 39 and the post 20' and between the plate 39 and the shoulder 29 exactly as in the types heretofore referred to.

As shown at Figure 9 the inset 37' is projected upon an inclination, the finger 38' serving the same purpose to support the plate 41 as in the case of the plate 39 except that the plate 41 is tapered, as shown in said figure and similar or identical wear plates 32 are interposed between the plate 41 and the post 20'' and between the plate 41 and the shoulder 29, as in the other types.

Functioning in exactly the same manner but with a slightly different type yoke is the modification shown at Figures 5 to 7 inclusive wherein a bar 42 is inserted between the spaced members 20' of the post and carries a shoulder 31' upon one side and a shoulder 29' upon the opposite side of the compound post. A wear member 43, shown in elevation at Figure 8, is interposed between the post and the yoke upon both sides, as indicated at Figure 7. Preferably this wear member is constructed as a rectangular open frame split at 44 so that it may be opened to be passed over the bar 42 and closed to occupy the necessary position. As the spaced members 20' are open at the bottom a pin 45 is employed to maintain the yoke in position.

While the device as shown is capable of being used with a ball bearing, as shown more particularly at Figures 1, 2 and 3, it is intended to use it also and perhaps preferably with the spindle type of caster. As shown at Figures 9 and 13 this spindle 46 is secured to the post structure by means of upsetting the end at 47 after being inserted through and between the side members of the post. For the purpose of rigidity the spindle is provided with an enlarged member 48 which may be cast or otherwise produced integral with the post 20'' if occasion should make desirable, such formation being indicated more particularly at Figures 9 and 11 although that form may be produced by riveting, as shown at Figure 13.

In the upper end of the spindle a ball 49 is positioned in any approved manner, preferably by drilling the top or extreme end of the spindle and inserting the ball therein and enclosing the margin of the drilled socket about a portion of the ball, leaving a segment of the ball exposed above the upper end of the spindle. This closing may be done in any approved manner, but is preferably done by a die press and at the operation of the closing and drilling the head of this spindle an anti-friction collar 50 is preferably placed in position. This anti-friction collar 50 will be composed of soft metal and will be formed by the dies to fit over the top of the head 51 of the spindle. The upper or closed end of this wear member performs no function other than to hold the device in position, the sides or furniture engaging against the interior of the socket only for eliminating as much of the friction as possible.

Also preferably the socket member which is shown in side elevation at Figure 14 will be provided with an anti-friction member. This anti-friction member is shown in side elevation at 52 in Figure 16 and in inverted plan at Figure 15. It is also shown in diametrical section at Figure 13. It is placed in position upon the socket member 53 by having its edges rolled outwardly and curved upwardly, as at Figure 4, to engage about the bead 55 of the socket member 53 which is inserted through the attaching plate 56 and upset outwardly. In the upsetting of this bead 55 a notch 57 will be produced, as shown at Figure 14 and to prevent the rotation of the wear member 52 relative to the socket, the edge or flange is indented as at 58 (see Figs. 15 and 16.)

The socket member is composed of a single piece folded at the top at 59 with a plate 60 carried therein against which the ball 49 engages. This is so that the plate 60 may be made of harder or more rigid material and against which the ball will engage without distorting the top of the socket member. The socket member is also provided with indentations 61 under the head 51 of the spindle to prevent the accidental displacement of the caster from the socket member.

The operation of the specific type shown on Sheet 2 of the drawings will be clearly understood. In explanation of the adjustability of all of the types shown in the drawings it may be pointed out that without weight exerted upon the caster the yoke of either type 20 or 28' is free to slide vertically upon the post of whichever type it is employed with. When, however, weight is exerted upon the top of the caster, as by the article of furniture in which it is attached, the member 31, the shoulder 29 and the wear plates 32 will grip so that the sliding action of the post relative to the yoke is overcome and the device will be locked at any latitude that the weight is applied. It may be released, however, by simply inserting the toe of the user under the toe-piece 36, lifting up, whereby the shoulder 29 is released from its binding engagement. The same thing is, of course, accomplished by pushing the toe of the user against the caster wheel 35 in the direction of the post, also thereby releasing the binding action of the yoke upon the post. The type shown at Figures 5 to 7 inclusive employs also the toe-piece 36 for the same purpose and similarly operating. In any case the article of furniture may be raised relative to the caster structure without hindrance, the yoke simply falling by gravity and sliding along the post. When, however, it is desired to raise the caster relative to the furniture, it is necessary to release the binding action by releasing the yoke from engagement with the post in the manner above pointed out, whereupon the article of furniture carrying the post may be lowered until the correct latitude is obtained, whereupon the release of the yoke will cause the yoke to bind against the retaining or locking members of the post and further movement restrained. In this manner the article of furniture may be leveled irrespective of inequalities in the floor or supporting structure or if occasion may make desirable one side of the article of furniture may be raised to a higher level than another, as for instance the tilting of the top of the table an appreciable amount should the exigencies of use make such tilting desirable.

What I claim is:

1. A caster comprising a rigid post having a vertical slot therethrough, a yoke having an attenuated portion extending through the vertical slot, and shoulders carried by the yoke member engaging the post member upon its opposite sides.

2. A caster comprising a rigid post composed of spaced plate-like members, a yoke having a bar extending laterally through the post member and movable longitudinally of the post and laterally of the bar, shoulders formed upon the opposite ends of the bar and adapted to lock against the opposite sides of the rigid post, and a caster wheel carried by the yoke.

3. A caster comprising a rigid post having a vertical slot therethrough, a yoke having an attenuated portion extending through the vertical slot, shoulders carried by the yoke member upon opposite sides of the post, and wear members interposed between the shoulders and the yoke positioned to engage the yoke.

4. A caster comprising a rigid post having a vertical slot therethrough, a yoke having an attenuated portion extending through the vertical slot, shoulders carried by the yoke member upon opposite sides of the post, and wear members interposed between the shoulders and post, said parts being so relatively proportioned that the wear members grip the opposite sides of the post upon an angular movement of the yoke.

5. A caster comprising a post composed of spaced plate-like members, a yoke having a bar extending laterally through the post member and movable longitudinally of the post and laterally of the bar, shoulders formed upon opposite ends of the bar and positioned upon opposite sides of the post, wear members interposed between the shoulders and the edges of the plate-like members, and a caster wheel carried by the yoke.

6. A caster comprising a rigid post composed of spaced plate-like members, a yoke having a bar extending laterally through the post and movable longitudinally of the post and laterally of the bar, shoulders formed upon opposite ends of the bar upon opposite sides of the post, wear members interposed between the shoulders and the edges of the plate-like members, said parts being so relatively proportioned that the wear members grip the edges of the plate-like members upon an angular movement of the yoke, and a caster wheel carried by the yoke.

In testimony whereof I hereunto affix my signature.

WILLIAM H. McALLISTER.